United States Patent
Ohta et al.

(10) Patent No.: US 7,171,515 B2
(45) Date of Patent: Jan. 30, 2007

(54) STORAGE UNIT WITH IMPROVED PERFORMANCE BY PURGING UNNECESSARY DATA AND TRANSFERRING DATA WITH HIGH PROBABILITY OF FUTURE HITS TO A SEGMENT BUFFER

(75) Inventors: Yoshiyuki Ohta, Kawasaki (JP); Katsuhiko Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 10/151,241

(22) Filed: May 21, 2002

(65) Prior Publication Data
US 2002/0178326 A1 Nov. 28, 2002

(30) Foreign Application Priority Data
May 22, 2001 (JP) ............................. 2001-151810

(51) Int. Cl.
G06F 12/00 (2006.01)
(52) U.S. Cl. ........................................ 711/113; 711/133
(58) Field of Classification Search ...................... None
See application file for complete search history.

(56) References Cited

U.S. PATENT DOCUMENTS

| | | | | |
|---|---|---|---|---|
| 5,652,857 A | * | 7/1997 | Shimoi et al. .............. | 711/113 |
| 5,787,466 A | * | 7/1998 | Berliner ...................... | 711/117 |
| 6,397,296 B1 | * | 5/2002 | Werner ........................ | 711/122 |
| 6,397,302 B1 | * | 5/2002 | Razdan et al. .............. | 711/141 |
| 6,636,946 B2 | * | 10/2003 | Jeddeloh ..................... | 711/138 |

* cited by examiner

Primary Examiner—Mano Padmanabhan
Assistant Examiner—Craig E Walter
(74) Attorney, Agent, or Firm—Staas & Halsey LLP (57) ABSTRACT

A storage unit which purges unnecessary data immediately and transfers data with high probability of future hits from a disk medium to a segment buffer in advance. A section calculates feature values of data to be stored in a new generated segment and relationships between preceding and succeeding commands. Next, a section retains the feature values for a predetermined period after segment data is purged from a segment buffer and stores the feature values of the purged segment as feature values of a segment with a high hit probability after the purge, when an address stored by the purged segment is read again. Then, a section does not purge a segment when the segment has feature values similar to those of the segment having a high hit probability, while purging another segment or other plural segments with a different feature value.

7 Claims, 7 Drawing Sheets

STORAGE UNIT WITH IMPROVED PERFORMANCE BY PURGING UNNECESSARY DATA AND TRANSFERRING DATA WITH HIGH PROBABILITY OF FUTURE HITS TO A SEGMENT BUFFER

CROSS REFERENCE TO RELATED APPLICATION

This application claims the priority of Japanese Patent Application No. 2001-151810 filed May 22, 2001 in Japan, the contents of which are incorporated herein by reference.

BACKGROUND OF THE INVENTION

1. Field of the Invention

The present invention relates to a storage unit such as hard disk drives of magnetic disk for example, readable/writable optical disk drives of magneto-optical disk for example etc.

The hard disk drives of computers comprises a segment buffer which temporarily stores write data written from a host computer to the disk medium and read data read from the disk medium to the host computer.

Data stored temporarily are retained, after the operations for the command are completed. When a new command is entered and any free space is not available in the segment buffer, the data are overwritten to be purged. However, if addresses on the disk medium for the new read command are the same as those accessed in the past and relevant data remains in the segment buffer, the remained data in the segment buffer is transferred to the host computer and processing is finished instead of reading the data from the disk medium.

In the case of the full hit above mentioned, the response to the host computer is quick, because there is no seek or rotational latency for disk operations. For such a case it is required to improve the response speed to the host computer by increasing the hit rate of the data in segment buffer.

2. Description of the Related Art

Figure 7:
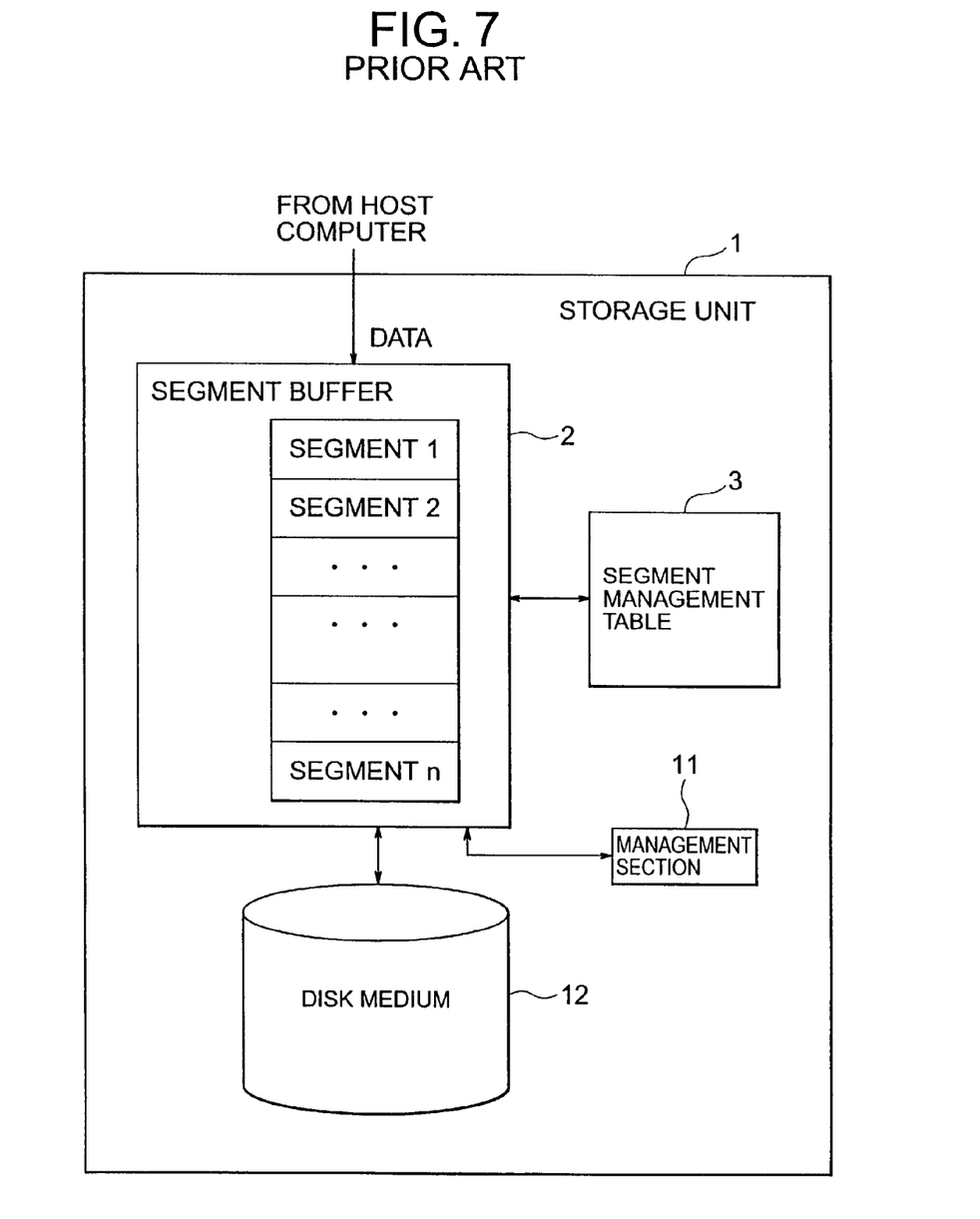
FIG. 7 is an explanatory diagram of a prior art example.

FIG. 7 shows a prior art illustrating a disk read/write method for a conventional storage unit.

As shown in FIG. 7, in the conventional disk soreage unit 1, a management section 11 manages the read data from the disk medium 12 in a segment buffer 2 which is divided into segment units. Addresses of LBAs (Logical Block Addresses) on the disk medium 12, data lengths, storage addresses in the segment buffer 2, command IDs, etc. are stored in the segments together with actual data.

Such a conventional storage unit 1 purges data from the segment buffer 2 based on an LRU (Least Recently Used) rule. According to the LRU rule, when the space is not available enough in the segment buffer 2 to store all the data for a read command at a point, the data stored in the segment buffer 2 according to the oldest command is purged.

The segment containing the data of a full hit time are purged based on the full hit rather than the initial creation time of the segment, because the data which is accessed repeatedly is high potential to be accessed again.

The above described conventional storage unit has the following problem.

According to the LRU rule, a segment which is not accessed from the host computer is purged regularly from an oldest segment buffer 2. On the other hand the disk access from the host computer is triggered by an OS or application on the host computer, and disk access occurs according to access patterns unique to the OS or application. However the conventional storage unit is not considered for the problem.

The hit rate will be increased by purging the inutile data, estimating the access patterns unique to the host to purge unnecessary data immediately and store the data with high probability of future hits from the disk medium 12 to the segment buffer 2 in advance, instead of selecting the segments to be purged based simply on the time factor. This will improve the performance of the storage unit 1. However any disk storing has not been made from the view point.

SUMMARY OF THE PRESENT INVENTION

An object of the present invention is to increase the hit rate for commands from a host computer and improve the performance of a storage unit by estimating access patterns unique to the host computer. The storage unit of the present invention estimates access patterns unique to the host to purge unnecessary data immediately and to transfer data with high probability of future hits from a disk medium to the segment buffer in advance.

1. A storage unit 1 of the present invention comprises a segment buffer which temporarily stores write data written from a host to a disk medium and read data read from the disk medium to the host computer; a management section which manages data; and a segment management table for managing the data storing of each segment in the segment buffer and storing control information about each segment.

Further the present invention comprises an access data feature value calculating section which calculates feature values of data accessed by a read command or write command having an address different from the address of the data stored in the segment buffer, when such a command is issued by the host computer and a corresponding segment is newly created; and a purged-segment feature value looking up section which retains feature values of data contained in the segment purged by an LRU rule and checks whether a read command issued later by the host computer accesses to the same address.

Wherein the above described access data feature value calculating section calculates feature values of data to be stored in every new generated segment and relationships between before and after commands of the command. The purged-segment feature value looking up section retains temporarily the feature values for a predetermined period, after segment data is purged from the segment buffer by the LRU rule because of no free space available in the segment buffer. When an address of the purged segment is read again, the feature value is stored as feature values of a segment with a high hit probability after the purge.

After this, when a segment is selected to be purged according to the LRU rule, the management section does not purge the segment, if it has feature values same to the value of a high hit probability. In the case, the management section purges another segments which has different feature values from the segment.

According to the above described storage unit 1 of the present invention, the management section can checks whether a segment selected to be purged according to the LRU rule has a potential to be hit in short time after purging or not. As the result the segment which has a potential to be hit in short time after having been purged is not purged immediately. That is, as estimating access patterns unique to the host computer, unnecessary data is purged immediately, and data with high probability of future hits is transferred from the disk medium to the segment buffer in advance. Thus it is possible to increase the hit rate and improve the performance of the storage unit.

2. In addition to the storage unit 1 of the present invention, the storage unit 2 comprises a disk access histogram count section and a command clustering section. The disk access histogram count section divides the storage area on the disk medium into blocks of sectors whose number has been predetermined from a managerial standpoint. The disk medium will be accessed on the block as an access unit. The disk access histogram count section generates a disk access histogram of every block. The command clustering section clusters LBA-based command histogram, which is produced by the disk access histogram count section, around maximum of the histogram to the LBA produced so as the maximum to be center of the divides area.

The described disk access histogram count section judges instantly whether commands before and after a read command during an interval of the access are accessed frequently. After returned the response to the read command, frequently accessed data in the segment buffer is left. The disk access histogram count section leaves the data in the segment buffer if the access of commands, which is before and after a read command at a point, belongs to high histogram blocs, even if the address of the read command belongs to a block of a low histogram of address.

According to the storage unit 2 of the present invention, as estimating access patterns unique to the host computer, it is possible to increase the hit rate in relation to host commands, purging unnecessary data immediately, and transferring data with high probability of future hits from the disk medium to the segment buffer in advance.

Further, when an address of a read command belongs to a block of a low histogram and the histograms of the addresses before and after the read command belong to high histogram blocs, even if the histogram of the address of the read command is low histogram, the data of the read command is left on the segment buffer. Thus, the performance of the storage unit can be improved.

3. Moreover, in addition to the storage unit 2 of the present invention, the storage unit 3 comprises a disk access distribution calculating section which stores the first LBAs of past n read commands, calculates the differences of the first LBA between the current read command and the past n read commands, and calculates relationships between the first LBA of the current read command and the first LBAs requested by each of the past read commands up to n.

The disk access distribution calculating section calculates differences between the first LBA of a new issued read command and the stored n first LBAs of the read commands, creates an access correlation diagram of the new command and the past commands based on the calculated differences.

When it is necessary to purge the stored data in order to store new data for the current command, all the read segments in the segment buffer are checked for the correlation diagram to purge data with a low hit probability for the next command. Further the data with low probability of a hit are extracted and purged. Thus only a part of the data relevant to each command are purged instead of purging all data relevant to the oldest command, and thereby leaves more data with a high hit probability in the segment buffer.

According to the storage unit 3 of present invention, as estimating access patterns unique to the host computer, it is possible to increase the hit rate in relation to host commands, purging unnecessary data immediately, and transferring data with high probability of future hits from the disk medium to the segment buffer in advance. In addition, the storage unit 3 of the present invention can purge only a part of the data relevant to each command instead of purging all data relevant to the oldest command. Thus more data with high hit probability in the segment buffer can be left, and the performance of the storage unit can be improved.

4. In addition to the storage unit 3 of the present invention, the storage unit 4 comprises compression/decompression section which compresses data stored in the segment buffer and returns it to the segment buffer, or decompresses data in the segment buffer and returns it to the segment buffer.

According to the storage unit 4 of the present invention, the data store in the segment can be compressed by using the data compression/decompression section before storing the data in the segment buffer. So more data can be stored in the segment buffer, and thereby increase the hit rate in response to host commands.

5. In addition to the storage unit 4 of the present invention, the storage unit 5 comprises a speculative read controller. The speculative read controller determines a position after head movement, which corresponds to a starting position of reading and the end position of a media read operation in the disk medium for a read command by adding front and rear margins of specified size based on the first LBA and data volume requested by the read command.

When accessing the disk medium in response to a read command, the speculative read controller always reads the front and rear margins containing much data with a high hit probability starting from the position of the final data for the previous command. The storage unit 5 of the present invention can read the front and rear margins containing much data with a high hit probability, regardless of the position where the head drops after a seek, based on the disk access distribution. Thus the hit rate for subsequent commands is increased.

6. A computer-readable storage medium storing a program which implements in a storage unit of the present invention comprises the following steps.

Calculating feature values of data to be stored in a new generated segment and relationships between preceding and succeeding commands; retaining said feature values for a predetermined period after the segment data is purged from the segment buffer by the LRU rule because no free space is available in the segment buffer; storing the feature values of said purged segment as feature values of a segment with a high hit probability after the purge if an address stored by said purged segment is read again.

Then, the program refrains from purging a segment which is selected to be purged according to the LRU rule, when the data has feature values similar to those of the segment which has a high hit probability, the data is not purged, while purging segments with different feature values.

7. A program which implements in a storage unit of the present invention comprises the following steps.

Calculating feature values of data to be stored in a new segment generated and relationships between preceding and succeeding commands; retaining said feature values for a predetermined period after segment data is purged from the segment buffer by the LRU rule because of no available free space in the segment buffer; and storing the feature values of said purged segment as feature values of a segment with high hit probability after the purge if an address stored by said purged segment is read again.

Then, the program refrains from purging a segment which is selected to be purged according to the LRU rule, when the data has feature values similar to those of the segment which has a high hit probability, the data is not purged, while purging segments with different feature values.

DETAILED DESCRIPTION OF THE PREFERRED EMBODIMENTS

Embodiments of the present invention are described below with reference to the drawings.

1. Explanation of Storage Unit Configuration

Figure 1:
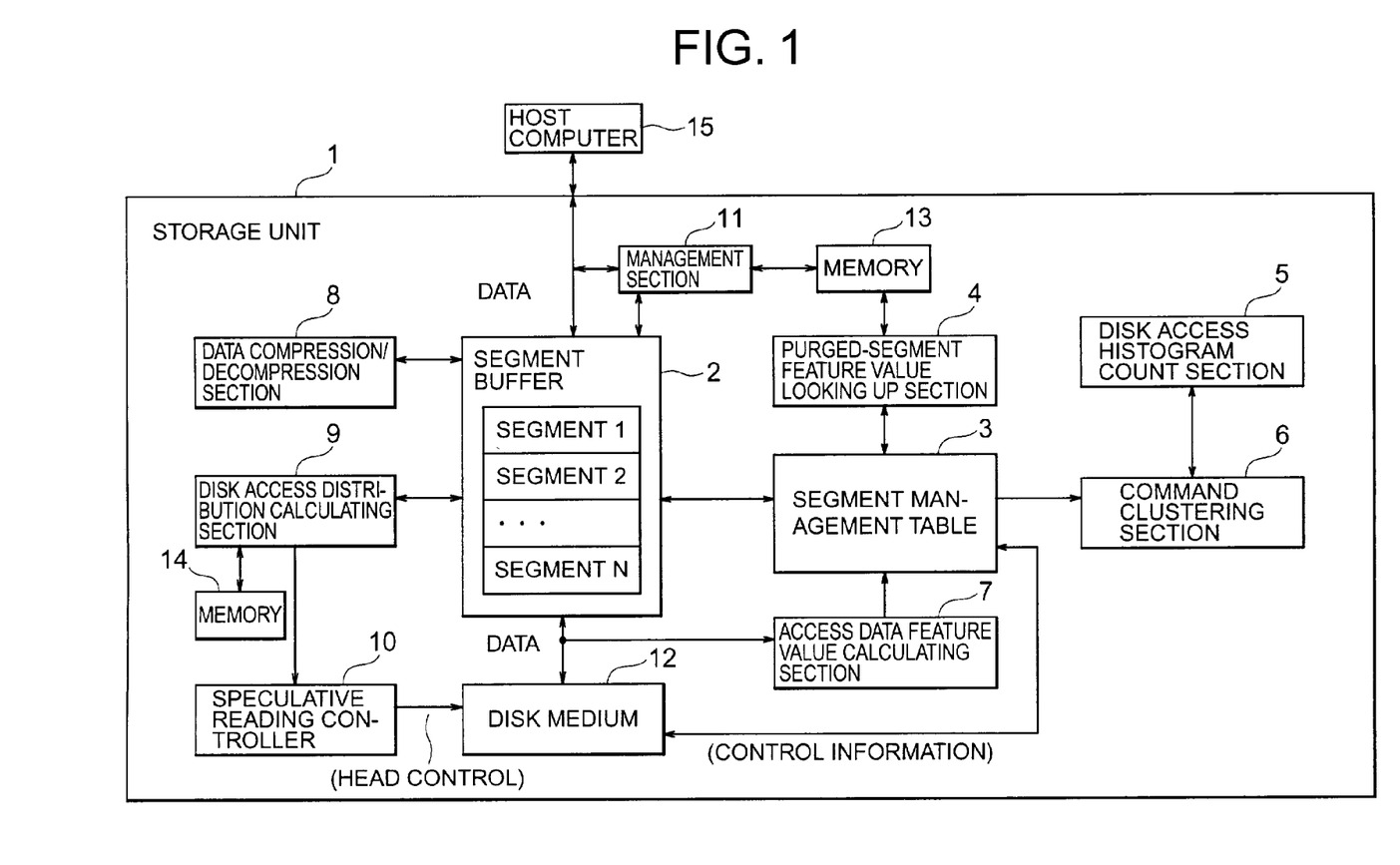
FIG. 1 is a block diagram of a storage unit according to an embodiment of the present invention.

FIG. 1 is the block diagram of a storage unit. The storage unit 1 is connected to a host 15. It comprises a segment buffer 2, a segment management table 3, a purged-segment feature value looking up section 4, a disk access histogram count section 5, a command clustering section 6, an access data feature value calculating section 7, a data compression/decompression section 8, a disk access distribution calculating section 9, a speculative read controller 10, a management section 11, a disk medium 12, memories 13 and 14, etc.

The management section 11 manages data, the segment buffer 2 temporarily stores write the data sent from the host computer 15 to the disk medium 12 and read the data read from the disk medium 12 to the host computer 15. When a read command or write command which accesses to an address different from those of the data stored in a segment buffer 2 is issued by the host computer 15 and a corresponding segment is newly created, the access data feature value calculating section 7 calculates feature values of data.

The purged-segment feature value looking up section 4 retains feature values of data contained in any segment purged by an LRU rule. When a read command is issued later by the host computer 15, the purged-segment feature value looking up section 4 checks whether the read command accesses to the same addresses.

The disk access histogram count section 5 divides the storage area on the disk medium 12 into blocks consisting of sectors whose number has been predetermined from a managerial standpoint, so that the disk medium 12 will be accessed for the block unit, and generates a disk access histogram of every block. The command clustering section 6 clusters commands address around maximum of the LBA-based command histogram to address of the commands so as the maximum to be centered based on a block histogram produced by the access frequency count section 5.

The disk access distribution calculating section 9 stores the first LBAs of past n read commands, calculates the differences in the first LBA between the current read command and the past n read commands, and calculates relationships between the first LBA of the current read command and the first LBAs requested by the past n read commands.

The data compression/decompression section 8 compresses data stored in the segment buffer 2 and returns it to the segment buffer 2, or decompresses data in the segment buffer 2 and returns it to the segment buffer 2.

The speculative read controller 10 adds front and rear margins of specified size based on the first LBA and data volume requested by the read command, and determined the position after head movement, which corresponds to a starting position of reading, and the end position of a media read operation for a read command on the disk medium.

The purged-segment feature value looking up section 4, disk access histogram count section 5, command clustering section 6, access data feature value calculating section 7, data compression/decompression section 8, disk access distribution calculating section 9, speculative read controller 10, and management section 11 are implemented by respective programs. The programs are stored in a non-volatile memory (not shown) in the storage unit 1 and are read out and executed by a CPU (or MPU) in the storage unit 1.

2. Explanation of Purging of the Present Invention

Effective purging of data in the segment buffer 2 are described below with reference to FIG. 1.

(i) First of all, when a read command is received from the host 15, the storage unit 1 stores the requested data in the segment buffer 2 after seek and rotational latency. The data stored in the segment buffer 2 is transferred to the host computer 15 according to a transfer protocol between the storage unit 1 and host computer 15.

The data storing in the segment buffer 2 is managed in segment units and control information, which is addresses on the disk and addresses in the segment buffer etc., are stored in the segment management table 3.

When data for a new read command is read from the disk medium 12, the an access data feature value calculating section 7 calculates an average first address, standard deviation, difference in LBA from the previous command and other features for past commands for example 100 commands, and stored them in the segment management table 3 at the same time. The average first address shows a feature representing a center of access, the standard deviation shows the concentration of access, and the difference in LBA from the previous command shows an index of uniform access.

Many accesses by past commands to concentrate on an areas around a few addresses, which depend applications. The command clustering section 6 clusters the region of the address based on addresses. Further the features like cluster group values around the access area caused by the access of the current read are calculated. The feature is stored in the segment management table 3.

A number of sectors are divided into a block for creating a histogram of LBAs. Because it reduces the size of memory for storing the histogram. The access number is counted for every block as counting unit to make the histogram.

When a new read command is received from the host computer 15, if there is not enough free space to store new data in the segment buffer 2, the data in the oldest segment is purged according to the LRU rule. In the processing, the feature values stored in the segment management table 3 is checked and stored in the memory 13 by the purged-segment feature value looking up section 4.

When a command accessing to an address same with the purged segment is issued, the purged-segment feature value looking up section 4 correlates between the feature values of accessed data and a command distances from the command of the feature to a command which hits to the feature. That is, the number of generated commands from the generation of the command relevant to the purged data to the hit command are counted. When a segments relevant to the read command is selected to be are purged, it is checked whether the segment has a high probability of future hits based on the correlation values. When it is found the segment has the feature, the segment is not purged even if it is old enough to be purged according to the LRU rule. In the case, another segment with different feature values is purged. Thus data with high hit probability are left in the segment buffer 2.

(ii) The management section 11 stores n first addresses requested past in the segment management table 3. Each time a new command is issued, the disk access distribution calculating section 9 calculates the differences between the first address of the new command and the n first addresses requested past. Further the disk access distribution calculating section 9 accumulates the difference for each new issued read command to make the histogram, which shows the correlation between the difference of the LBA and the n commands requested past. The calculated correlation is stored in the memory 14.

Some applications show that commands close in time to each other may often access to similar areas or, once accessed, the address may not be accessed for some time. The features depend on applications. The hit rate can be increased by transferring not only requested data, but also data around it, to the segment buffer 2 using such features.

Data around requested data can no longer be read from the disk medium during rotational latency or the like if it becomes distant from the requested data. However, this can be dealt with by using multiple heads.

(iii) Instead of purging the oldest data all at once, data which is not likely to hit is purged gradually by referring to the access distribution for the past n commands. Also, the data stored in the segment buffer 2 is compressed by the data compression/decompression section 8 to store more data in the segment buffer 2, and thereby increase the hit rate.

Since data is transferred to the host computer 15 after decompression, the response performance is concerned. When the speed is needed, the compression and decompression are used only for such data that has a low hit probability at a point, but has a high hit probability later when distances between commands become large. As the data is compressed only at a point of low hit probability, the segment buffer 2 is used effectively.

3. Explanation of Concrete Examples

Figure 2:
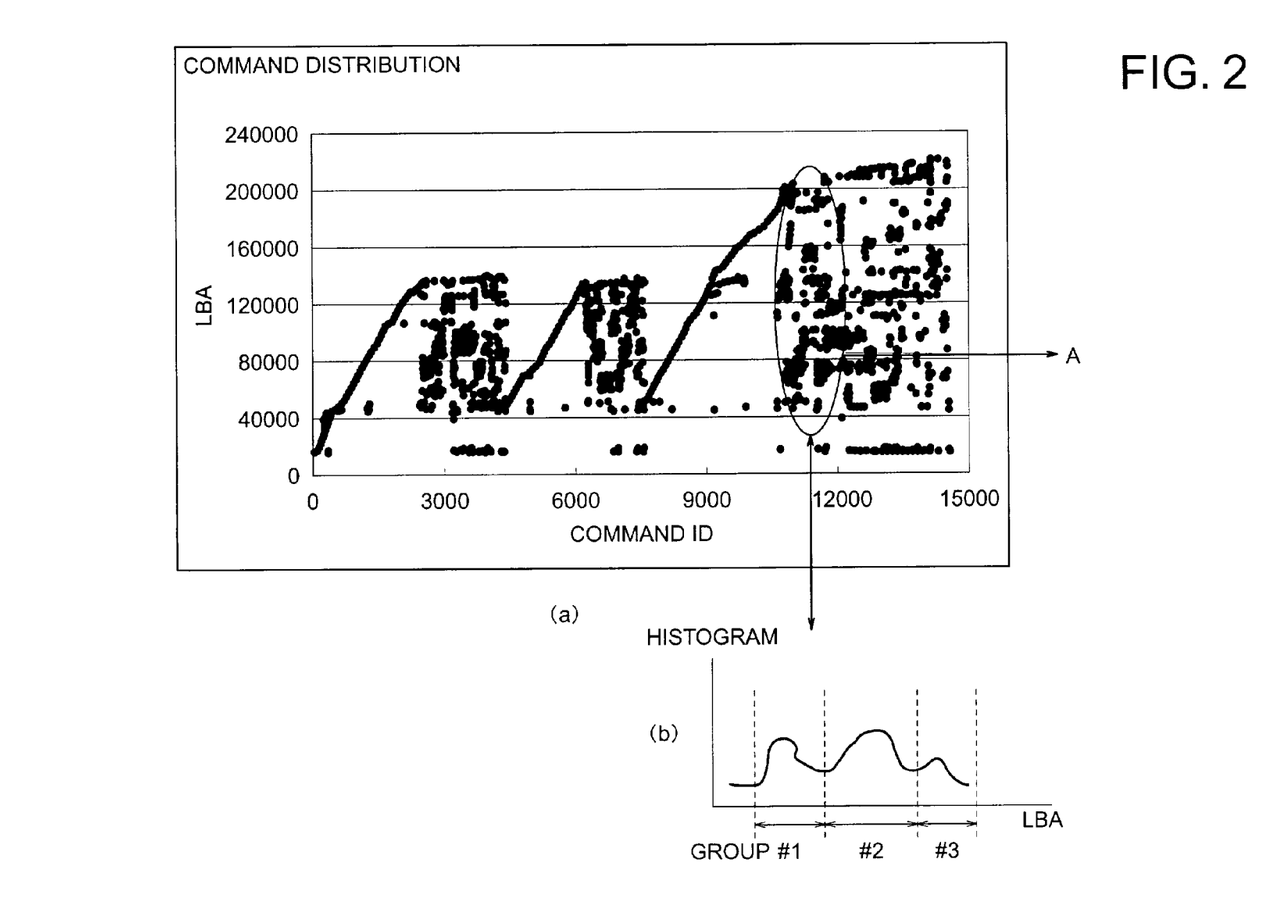
FIG. 2 is an explanatory diagram of an LBA histogram and clustering according to an embodiment of the present invention (1 of 3).
Figure 3:
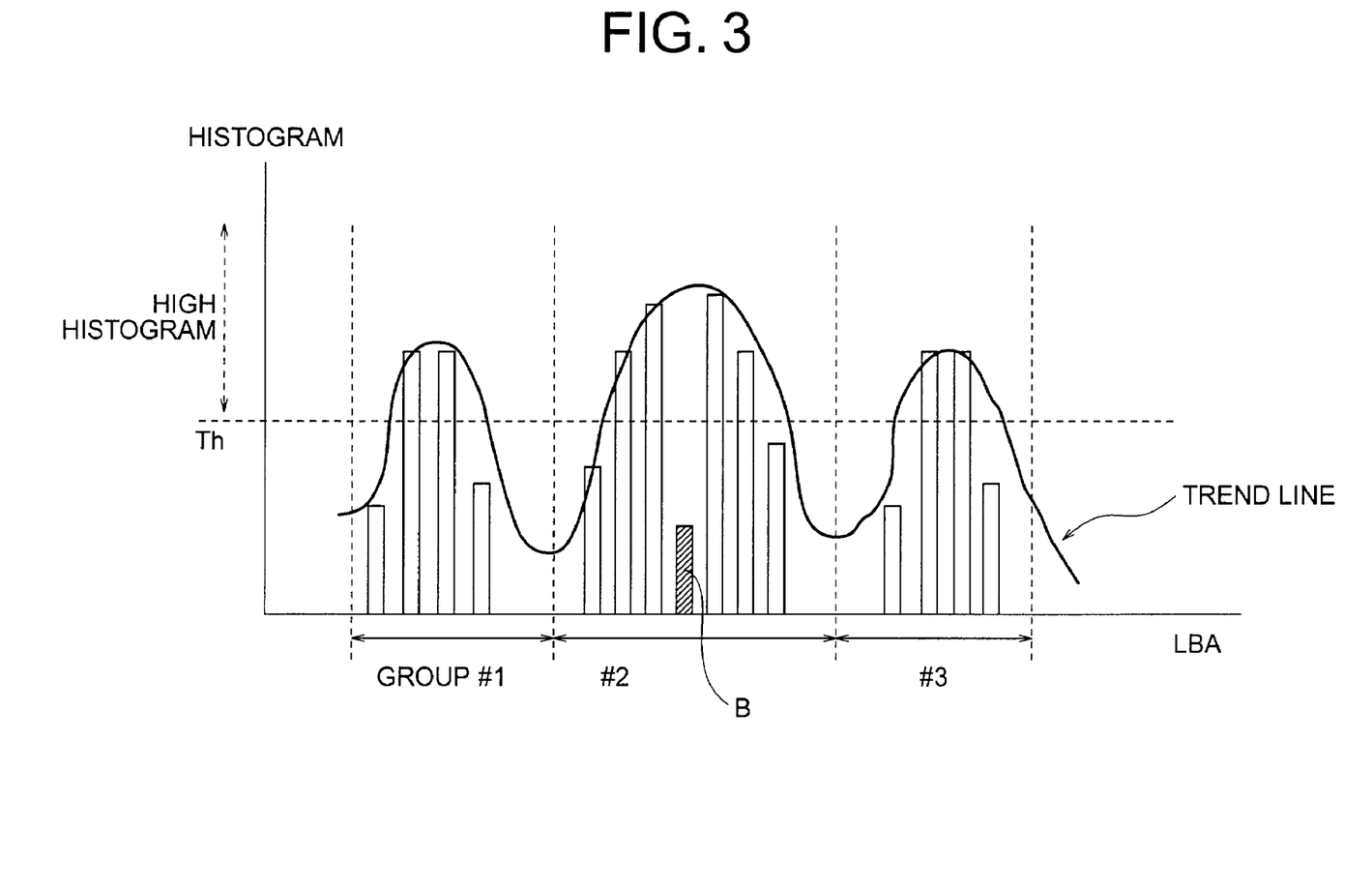
FIG. 3 is an explanatory diagram of an LBA histogram and clustering according to an embodiment of the present invention (2 of 3).
Figure 4:
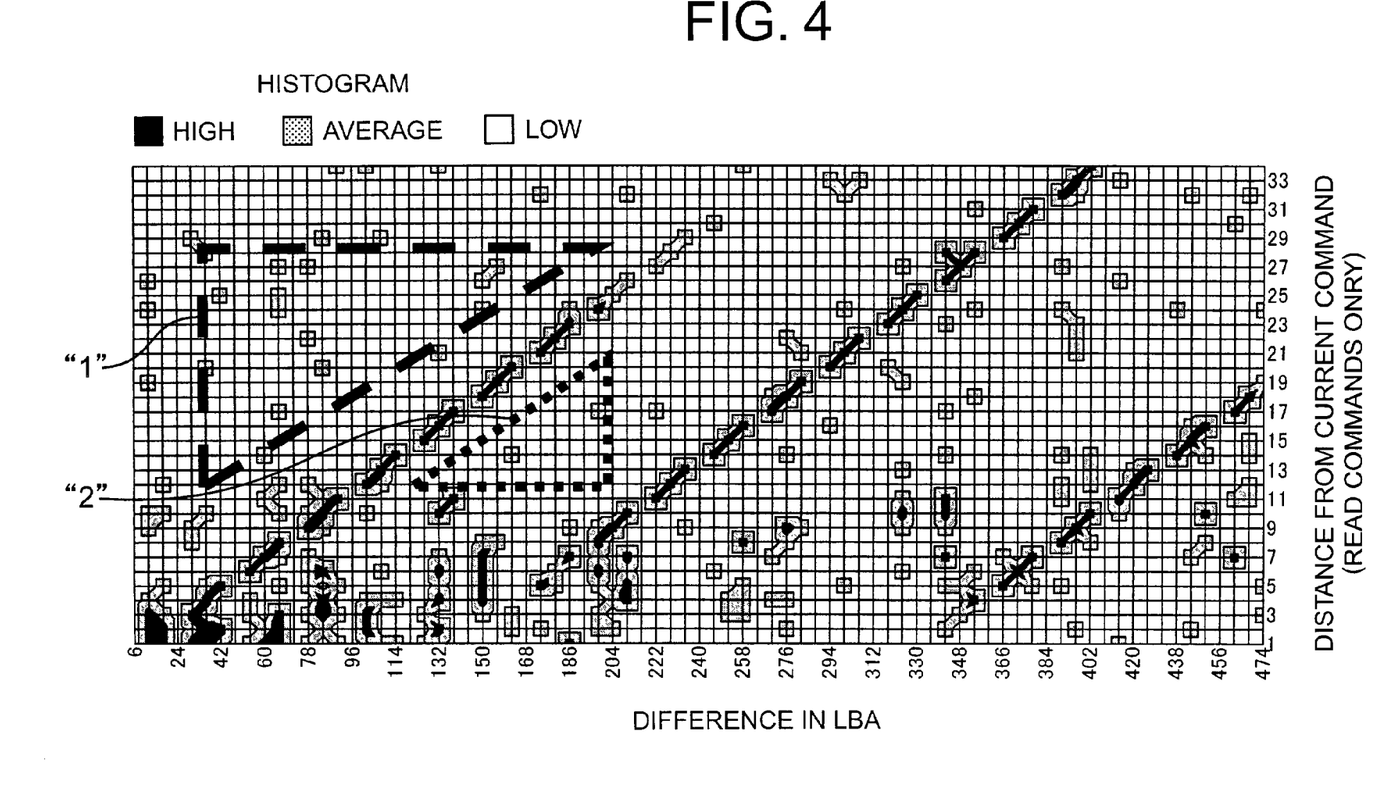
FIG. 4 is an explanatory diagram of an LBA histogram and clustering according to an embodiment of the present invention (3 of 3).

FIG. 2 is a diagram of an LBA histogram and clustering (1 of 3), FIG. 3 is a diagram of an LBA histogram and clustering (2 of 3), and FIG. 4 is a diagram of an LBA histogram and clustering (3 of 3). Concrete examples are described below with reference to FIGS. 2 to 4.

(i) Processes of calculating feature values of segments and detecting segments which is requested after purged by the LRU rule are as following (see FIG. 2).

According to the LRU rule, data accumulated in a segment buffer is purged based simply on the time factor, that is, whether the segment is accessed old or not. However, commands from the host computer 15 originate from an OS or application, thus the data accesses are specific to each application.

Thus, data likely to be accessed by the host computer 15 in the future is predicted and retained in the segment buffer 2, based on feature values such as features of data relevant to commands like LBA values, data size, etc. and correlation between the issued commands before and after the current command. The feature values are as the following of a segment-generating command and between commands before and after the current command: ① the variance, which is standard deviation, of the first LBAs, ② average of LBA, and ③ the LBA of the difference with a command before a current command etc.

FIG. 2 shows an example how the storage unit 1 is accessed when an application is executed by the host computer 15. In the drawing, where the horizontal axis represents the command ID of numbers 0 to 15000, and the vertical axis represents the LBA of 0 to 240000, black dots shows distribution of commands of read commands and write commands from the host computer 15. According to this command distribution, access from the host computer 15 is concentrated on a few areas. The command IDs on the horizontal axis have been assigned to read commands and writes commands approximately in the order they were issued.

As can be seen from the command distribution in FIG. 2, access at a point is concentrated on an areas around a few LBAs and not scattered uniformly. Besides, since frequently accessed areas are highly likely to be accessed again, it is important as the feature whether a read command at a point accesses to a frequently accessed address.

Specifically, as shown in FIG. 3, a histogram is made by classifying issued commands according to LBA so that a command at a point is clustered into some groups #1, #2, . . . , and so on around a maximal of the histogram. The group number to which each command belongs is stored.

(ii) Explanation about Block Reading (See FIG. 3)

When clustering described above, a histogram of every LBAs has to be calculated. A number of sectors are grouped into blocks to make the histogram of LBAs, and the blocks is read as reading unit in the medium. A read counter for the block unit will take up 640 KB assuming the following: the capacity of storage unit, which is used recently, is about 20 GB, 1 sector=512 B, 32 sectors=1 block, and the counter is a 4-bit counter.

This is realistic considering the fact that buffer size in recent storage unit is 2 MB or larger, and will be 8 MB in the near future. If the processing is implemented only for one application, the area required for the counter can be reduced considerably.

For example, for 20 GB=20×1024×1024×1024 B=1280× 1024 blocks, the area for counter is 640 KB. Besides, if a histogram of every block unit is obtained, it can be known instantly from the value to which an issued command belongs whether the command accesses to a frequently accessed block or not.

As a result of clustering, if a block is located near addresses which are accessed frequently (see FIG. 3), it is beter for the data to be retained in the segment buffer 2, even if the block itself has a low access frequency.

That is, in the histogram of every block unit in FIG. 3, the block B has a low access frequency, but belongs to a high histogram group. Thus, its data can be retained in the segment buffer.

(iii) Description of How to Rescue a Segment Which is Purged by LRU Rule by the Feature Value.

Even after a segment is purged according to the LRU rule, its LBA, size and feature values are retained until m commands or command ID are issued. If the segment is hit by a read command, the feature values are retained and a histogram is calculated for each feature value even after m commands are issued.

If a feature value has a concentration in histogram, the feature is corresponds to many histograms of LBAs, it is checked whether the corresponding feature value of a segment selected as a purged candidate according to the LRU rule is in the concentrated region. If it is in the concentrated region, the purge candidate is retained in the segment buffer and another segment, which is an old segment whose feature value is not in the concentrated region, is purged instead. In this way, segments with high hit probability can be stored based on the feature values calculated for each segment from the command history.

(iv) Explanation about Operations of Reading Front and Rear Margins (See FIG. 4)

FIG. 4 shows a chart generated for the same application of the condition as following: the first LBA of the past 34 read commands are retained. When a new read command is issued, the differences from the first LBA is calculated for the past 34 read commands. The histogram of the deference of the LBA from the current command to the past n (1, 2, 3, 4 . . . ) is accumulated.

In FIG. 4, a horizontal axis represents LBA difference and a vertical axis, which is a time axis, represents command difference of only read commands from a current point, which is 1 of the vertical axis in the drawing, and FIG. 4 represents histograms and clastering of every LBA difference on which each histogram range unit is plotted.

As can be seen from FIG. 4, the probability of future hits can be increased by reading data before and after a requested data. Even with conventional storage unit, if the head drops considerably ahead of the requested first segment at the end of a seek of a before read command, the data of front margin between that position and the requested first segment is also read into the segment buffer.

Also, after all requested data has been read, conventional storage unit reads data of rear margin behind the requested data into the segment buffer if time is available before the next command is issued. However, according to this embodiment, sufficiently wide front and rear margins are always read to allow for future hits.

In this case, although overheads are required to read front and rear margins, the probability of future hits is increased. When the storage unit achieves greater packaging density in the future, for example, the overheads for reading front and rear margins can be eliminated by an equipment of multiple heads.

(v) Explanation of Another Example

Another example is that always starts a data read from a point where the head drops. This method eliminates overheads for reading front and rear margins even from current storage unit of one-head, because front and rear margins can be read during the rotational latency or during the idle time before the next command is issued although the hit rate is lower than in the case described above.

In this case, when the head drops behind a requested data after the seek, even if the data beyond that point cannot be stored in an area continuous with the area which contains the requested data on the segment buffer 2, more data is accumulated in the segment buffer 2 by associating the data up to the end of the track with the requested first LBA to store it in the segment buffer.

(vi) Explanation about Partial Purging of Segment Data (See FIG. 4)

It is shown that in the case of the application in FIG. 4, with increases in the distance between commands, fewer commands access the data, which is in areas "1", surrounded by broken lines around requested data again. The data in this area is not likely to contribute to full hits in the future even if it is retained.

With conventional storage unit, when there is not enough free space to store new data in a segment buffer, all the data for the oldest command is purged. However, the present system purges infrequently accessed data by extracting only such data from each segment of the segment buffer with reference to past accesses.

In the example of FIG. 4, only the data represented by "1" surrounded by broken lines is purged from all the segments of the segment buffer. This makes the hit probability of the retained data higher in the segment buffer 2.

(vii) With Respect to Compressing Data with Low Hit Probability (See FIG. 4)

In FIG. 4, data at some addresses of areas "2" surrounded by broken lines is accessed infrequently for a period of time and then accessed frequently after that period. Data in these areas is stored in a compressed state during the period of infrequent access and the data is decompressed and stored in the segment buffer 2 during the periods of frequent access, thereby increasing the storage capacity of the segment buffer 2.

A method compressing all the data on the segment buffer 2 and decompressing it before transferring it to the host 15 is capable. However, this method needs time for decompression, resulting in a delayed response from the disk. The host computer 15 issues the commands with interval about several 10 microseconds to 100 microseconds. According to this embodiment, data with high hit probability is compressed and decompressed during this interval and the host computer 15 responds at conventional speed.

4. Explanation about Execution of a Read Command Issued by the Host Computer

Figure 5:
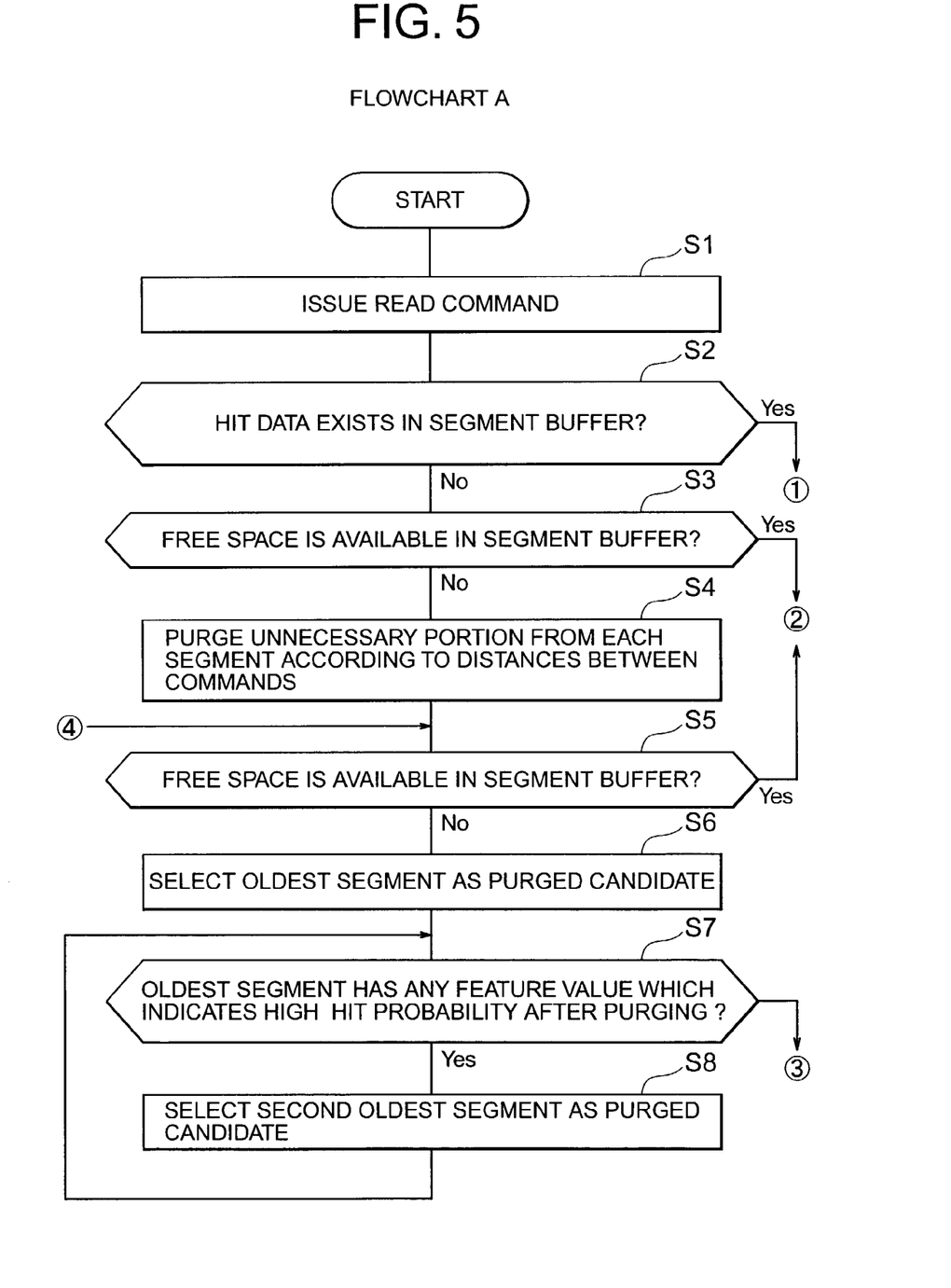
FIG. 5 is a flowchart A of read command processing according to the embodiment of the present invention.
Figure 6:
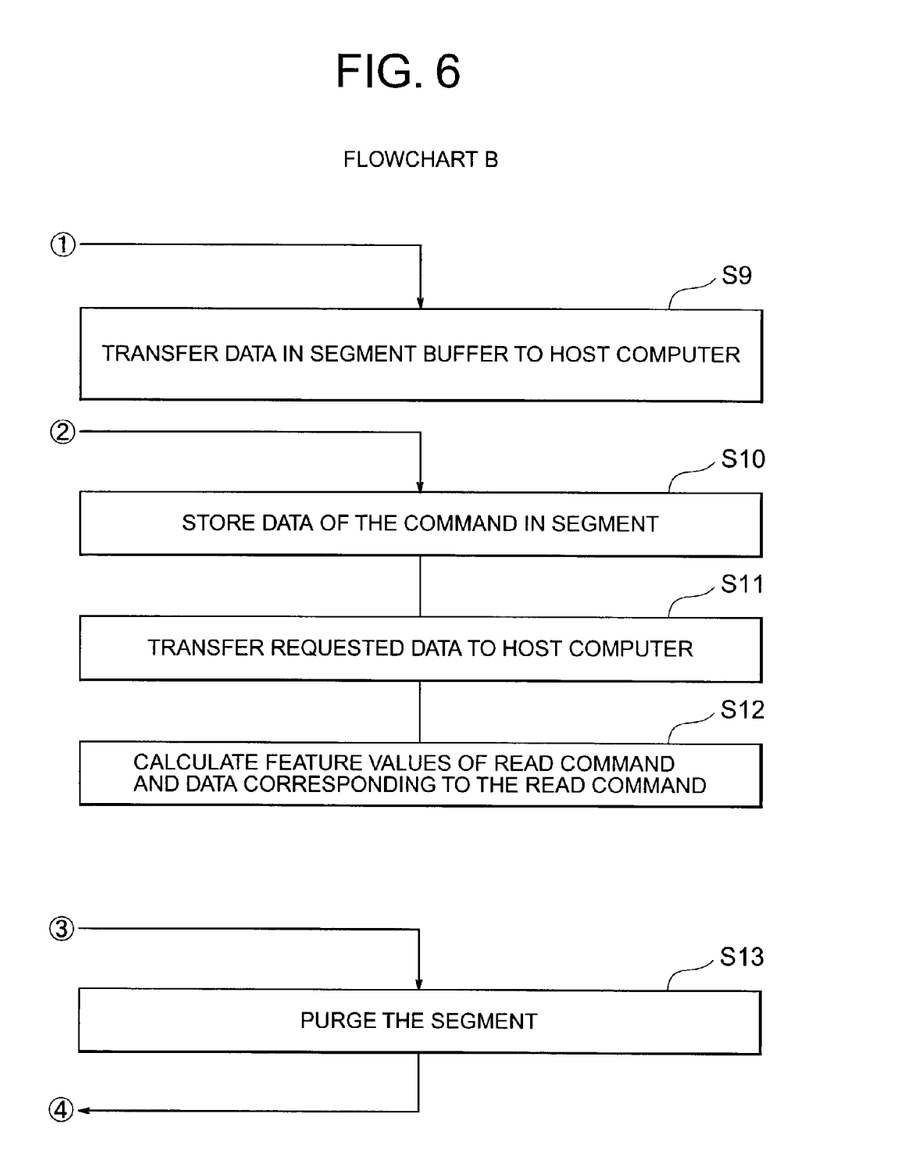
FIG. 6 is a flowchart B of read command processing according to the embodiment of the present invention.

FIG. 5 shows a flowchart A of read command processing and FIG. 6 shows a flowchart B of read command processing. The execution of a read command issued by the host computer is explained referring to FIGS. 5 and 6. S1 to S13 represent processing steps.

When a read command is issued by the host computer 15 to the storage unit 1 (S1), the management section 11 of the storage unit 1 judges whether hit data is present in the segment buffer 2 (S2). If hit data is found in the segment buffer 2, the management section 11 transfers the data in the segment buffer 2 to the host computer 15 (S9). If no hit data is found in the segment buffer 2, the management section 11 judges whether free space is available in the segment buffer 2 (S3).

As a result, if free space is not available in the segment buffer 2, the management section 11 purges an unnecessary portion from each segment according to distances between commands (S4) and judges again whether free space is available in the segment buffer 2 (S5). If free space is not available in the segment buffer 2, the oldest segment is selected as a purge candidate (S6) and the purged-segment feature value looking up section 4 judges whether the oldest segment has any feature value which indicates a high hit probability after the purge (S7).

As a result, if it is judged that the oldest segment has a feature value which indicates a high hit probability after the purge, the second oldest segment is selected as a purge candidate (S8) and the flow goes to Step S7. If it is judged in Step S7 that the oldest segment has no feature value which indicates high hit probability after the purge, the management section 11 purges this segment (S13) and the flow goes to Step S5.

If it is judged in Step S3 that free space is available in the segment buffer 2, the management section 11 stores the command data in a segment (S10) and transfers the requested data to the host computer 15 (S11). Then, the access data feature value calculating section 7 calculates the feature values of the read command and data corresponding to the read command (S12).

The many features and advantages of the present invention are apparent from the detailed specification and, thus, it is intended by the appended claims to cover all such features and advantages of the invention which fall within the true spirit and scope of the invention. Further, since numerous modification and changes will readily occur to those skilled in the art, it is not desired to limit the invention to the exact construction and operation illustrated and described, and accordingly all suitable modification and equivalents falling within the scope of the invention may be included in the present invention.

What is claimed is:

1. A storage unit which comprises:
a segment buffer which temporarily stores write data written from a host computer to a disk medium and read data read from the disk medium to the host computer;
a management section which manages data;
a segment management table for managing at every segment the data stored in the segment buffer and storing control information about each segment;
an access data feature value calculating section which calculates feature values of data accessed by a read command or write command which accesses an address different from those of the data stored in the segment buffer, when such a command is issued by the host and a corresponding segment is newly created; and
a purged-segment feature value looking up section which retains feature values of data contained in any segment purged by a Least Recently Used ("LRU") rule and checks whether a read command issued later by the host computer accesses to the same address of the purged data, wherein
said access data feature value calculating section calculates feature values of data to be stored in any new segment generated and relationships between preceding and succeeding commands,
said purged-segment feature value looking up section retains said feature values for a predetermined period after segment data is purged from the segment buffer by the LRU rule because of no available free space in the segment buffer and stores the feature values of said purged segment as feature values of a segment with a high hit probability after the purge when an address stored by said purged segment is read again, and
said management section does not purge a segment which is selected to be purged according to the LRU rule if it has feature values similar to those of the segment having a high hit probability after the purge, while purging segments with different feature values.

2. The storage unit according to claim 1 comprising:
a disk access histogram count section which divides a storage area on the disk medium into blocks consisting of sectors whose number has been predetermined, so that the disk medium is accessed at a block, and generates a disk access histogram of every block unit; and
a command clustering section which clusters command address around maximal values of a Logical Block Address ("LBA") based command histogram according to address values at every block produced by said disk access histogram count section,
wherein said disk access histogram count section judges whether a read command at a point accesses to an address accessed frequently in a series of addressing, returns a response to the read command, and leaves frequently accessed data in the segment buffer, and said disk access histogram count section leaves the data in the segment buffer when an address of the segment buffer containing the read command at a point is contained within an area that is in close proximity to a frequently accessed address in a series of addressing even if the address relevant to the read command belongs to an infrequently accessed block.

3. The storage unit according to claim 2 comprising:
a disk access distribution calculating section which stores first LBAs of past n read commands, calculates differences in the first LBA between the current read command and the past n read commands, and calculates relationships between the first LBA of the current read command and the first LBAs of each of requested by past n read commands,
wherein said disk access distribution calculating section calculates differences between the first LBA of a new read command issued and each of the stored past n first LBAs, creates an access correlation diagram of the new command and past commands based on the calculated differences, refers the data in all the read segments of the segment buffer to said correlation diagram when purging stored data in order to store data for the current command, purges the data with low probability of a hit for the next command by extracting only a part of the data relevant to each command instead of purging all data relevant to the oldest command, and thereby leaves more data with high hit probability in the segment buffer.

4. The storage unit according to claim 3 comprising:
a data compression/decompression section which compresses data stored in the segment buffer and returns the compressed data to the segment buffer, and decompresses data in the segment buffer and returns the decompressed data to the segment buffer,
wherein said data compression/decompression section compresses the data in the segment buffer before storing the data in the segment buffer to store more data in the segment buffer, and thereby increases a hit rate.

5. The storage unit according to claim 4 comprising:
a speculative read controller which determines the position after head movement and the end position of a media read operation for a read command in the disk medium by adding front and rear margins of specified size based on the first LBA and data volume requested by the read command,
wherein, when accessing the disk medium in response to a read command, said speculative read controller always reads front and rear margins containing much data with high hit probability, starting from the position of the final data for the previous command, and thereby increases a hit rate for subsequent commands because of a disk access distribution, regardless of a head drop position after a seek.

6. A computer-readable storage medium storing a program which implements in a storage unit procedures comprising:
calculating feature values of data to be stored in a new generated segment and relationships between preceding and succeeding commands;
retaining said feature values for a predetermined period after segment data is purged from a segment buffer by a Least Recently Used ("LRU") rule because no free space is available in the segment buffer;

storing the feature values of said purged segment as feature values of a segment with a high hit probability after the purge if an address stored by said purged segment is read again; and refraining from purging a segment which is selected to be purged according to the LRU rule, when the segment data has feature values similar to those of a segment which has a high hit probability after the purge, while purging segments with different feature values.

7. A method of operating a data processing system comprising:

calculating feature values of data to be stored in a new segment generated and relationships between preceding and succeeding commands;

retaining said feature values for a predetermined period after segment data is purged from a segment buffer by a Least Recently Used ("LRU") rule because of no available free space in the segment buffer;

storing the feature values of said purged segment as feature values of a segment with high hit probability after the purge if an address stored by said purged segment is read again; and refraining from purging a segment which is selected to be purged according to the LRU rule, when the segment data has feature values similar to those of a segment which has a high hit probability after the purge, while purging segments with different feature values.

* * * * *